United States Patent
Bicanic et al.

(10) Patent No.: US 11,774,833 B2
(45) Date of Patent: Oct. 3, 2023

(54) METHODS, SYSTEMS, APPARATUSES, AND DEVICES FOR FACILITATING CONTROLLING OPERATION OF A CONTENT CAPTURING DEVICE

(71) Applicants: Nikola Vladimir Bicanic, Venice, CA (US); Dmytro Korobov, Venice, CA (US)

(72) Inventors: Nikola Vladimir Bicanic, Venice, CA (US); Dmytro Korobov, Venice, CA (US)

( * ) Notice: Subject to any disclaimer, the term of this patent is extended or adjusted under 35 U.S.C. 154(b) by 0 days.

(21) Appl. No.: 18/016,872

(22) PCT Filed: Jul. 26, 2022

(86) PCT No.: PCT/US2022/038257
§ 371 (c)(1),
(2) Date: Jan. 19, 2023

(65) Prior Publication Data
US 2023/0251555 A1    Aug. 10, 2023

Related U.S. Application Data

(60) Provisional application No. 63/308,325, filed on Feb. 9, 2022.

(51) Int. Cl.
*G03B 17/56* (2021.01)
*H04N 23/51* (2023.01)
*H04N 23/661* (2023.01)

(52) U.S. Cl.
CPC .......... *G03B 17/563* (2013.01); *H04N 23/51* (2023.01); *H04N 23/661* (2023.01)

(58) Field of Classification Search
CPC ..... G03B 17/563; H04N 23/061; H04N 23/51
See application file for complete search history.

(56) References Cited

U.S. PATENT DOCUMENTS

| | | | | |
|---|---|---|---|---|
| 4,329,041 A | * | 5/1982 | Madge | G03B 17/563 396/425 |
| 2009/0003822 A1 | * | 1/2009 | Tyner | G03B 17/561 396/428 |
| 2014/0206451 A1 | | 7/2014 | Helmes et al. | |

(Continued)

*Primary Examiner* — Amy R Hsu
(74) *Attorney, Agent, or Firm* — Dhiraj Jindal; PATENT YOGI LLC (57) ABSTRACT

Disclosed herein is an apparatus for facilitating controlling operation of a content capturing device, in accordance with some embodiments. Accordingly, the apparatus comprises an apparatus body, an attachment mechanism, input devices, a memory device, a processing device, and a communication interface. Further, a shaft portion of the apparatus body is grasped for holding the apparatus body. Further, the attachment mechanism couples the apparatus body to a content capturing device. Further, the input devices may be reachable for manipulating while holding the apparatus body. Further, the input devices transition to one of input device states. Further, the memory device retrieves a map data comprising a mapping between the input device states and parameter control commands. Further, the processing device generates a parameter control command based on one of the input device states and the map data. Further, the communication interface transmits the parameter control command to the content capturing device.

15 Claims, 6 Drawing Sheets

(56) References Cited

U.S. PATENT DOCUMENTS

| | | |
|---|---|---|
| 2014/0362254 A1* | 12/2014 | Kuwahara .......... H04N 1/00965 |
| | | 348/231.4 |
| 2015/0042830 A1* | 2/2015 | Reid ..................... F16M 11/28 |
| | | 348/211.7 |
| 2016/0261782 A1 | 9/2016 | Li |
| 2016/0361627 A1 | 12/2016 | Fujita et al. |
| 2017/0302842 A1* | 10/2017 | Voss ..................... G03B 17/563 |
| 2018/0124304 A1* | 5/2018 | Niemeyer .............. F16M 13/04 |
| 2019/0327407 A1 | 10/2019 | Yu et al. |
| 2021/0038053 A1* | 2/2021 | Lesch ................... A61B 1/0655 |
| 2021/0227106 A1* | 7/2021 | Nakashima ............ G03B 13/04 |

* cited by examiner

METHODS, SYSTEMS, APPARATUSES, AND DEVICES FOR FACILITATING CONTROLLING OPERATION OF A CONTENT CAPTURING DEVICE

CROSS-REFERENCE TO RELATED APPLICATION

This application claims the benefit of U.S. Provisional Patent Application No. 63/308,325, titled "METHODS AND SYSTEMS FOR FACILITATING CONTROLLING CAMERA OPERATIONS USING A MULTI-FUNCTIONAL ERGONOMIC HANDLE", filed on 9 Feb. 2022, which is incorporated by reference herein in its entirety.

FIELD OF THE INVENTION

Generally, the present disclosure relates to the field of data processing. More specifically, the present disclosure relates to methods, systems, apparatuses, and devices for facilitating controlling operation of a content capturing device.

BACKGROUND OF THE INVENTION

Existing techniques for facilitating controlling operation of a content capturing device are deficient with regard to several aspects. Further, many modern digital cameras are designed to be as small as possible. Further, ergonomics is sacrificed while making a camera very small. Further, it becomes very hard to hold the camera and even harder to change the features quickly while using the camera. Further, while using the camera, an individual may need 6 or 7 clicks (of different buttons) all while looking at the screen of the camera to modify a camera setting/feature. Further, when the camera device has a touchscreen and the touching the touchscreen is required to make changes to the settings of the camera this makes taking stable video/photos challenging.

Therefore, there is a need for improved methods, systems, apparatuses, and devices for facilitating controlling operation of a content capturing device that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating controlling operation of a content capturing device, in accordance with some embodiments. Accordingly, the apparatus may include an apparatus body, at least one attachment mechanism, a plurality of input devices, a memory device, a processing device, and at least one communication interface. Further, the apparatus body may include a shaft portion, a first shoulder portion, and a second shoulder portion. Further, the shaft portion extends between a first end and a second end. Further, the shaft portion may include a first side and a second side opposite to the first side. Further, the shaft portion may include at least one first depression laterally disposed on the first side along a length of the shaft portion. Further, the shaft portion may include a second depression longitudinally disposed on the second side proximal to the first end. Further, the first shoulder portion extends laterally on the first side in relation to the shaft portion from the first end. Further, the second shoulder portion extends laterally on the second side in relation to the shaft portion from the first end. Further, the at least one first depression may be configured for receiving at least one finger of a human hand. Further, the second depression may be configured for receiving a thumb of the human hand. Further, the shaft portion may be configured to be grasped by a palm of the human hand, the at least one finger, and the thumb based on the receiving of the at least one finger and the receiving of the thumb for holding the apparatus body by the human hand. Further, the at least one attachment mechanism may be attached to the apparatus body. Further, the at least one attachment mechanism may be configured for coupling the apparatus body to at least one content capturing device. Further, the plurality of input devices may include a first input device, a second input device, and a third input device. Further, the first input device may be mounted in the second depression, the second input device may be mounted on the first end of the shaft portion, and the third input device may be mounted on a top side of the first shoulder portion. Further, at least one of the first input device, the second input device, and the third input device may be reachable for manipulating by at least one of the thumb and the at least one finger while holding the apparatus body based on the mounting of at least one of the first input device, the second input device, and the third input device. Further, the plurality of input devices may be programmable for controlling at least one parameter of at least one of a plurality of operations of the at least one content capturing device. Further, at least one of the plurality of input devices may be configured to be transitioned to one of a plurality of input device states for the controlling of the at least one parameter of at least one of the plurality of operations based on the manipulating. Further, at least one of the first input device, the second input device, and the third input device may include at least one movable element movably mounted on the apparatus body. Further, the at least one movable element of the first input device may be configured to be moved between a plurality of positions based on at least one input user action received by the at least one movable element from the thumb. Further, the at least one movable element of the second input device may be configured to be moved between the plurality of positions based on the at least one input user action received by the at least one movable element from an index finger of the at least one finger. Further, the at least one movable element of the third input device may be configured to be moved between the plurality of positions based on the at least one input user action received by the at least one movable element from the index finger. Further, the transitioning of at least one of the plurality of input devices to one of the plurality of input device states corresponds to the moving of the at least one movable element of at least one of the first input device, the second input device, and the third input device to one of the plurality of positions. Further, the memory device may be disposed on the apparatus body. Further, the memory device may be configured for retrieving a map data comprising a mapping between at least one of the plurality of input device states of at least one of the plurality of input devices and at least one of a plurality of parameter control commands for the controlling of the at least one parameter of at least one of the plurality of operations of the at least one content capturing device. Further, the processing device may be disposed on the apparatus body. Further, the processing device may be communicatively coupled with the plurality of input devices and the memory device. Further, the processing device may be configured for generating at least one parameter control command based on at least one of the plurality of input device states of at least one of the plurality of input devices and the map data. Further, the at least one communication interface may be disposed on the apparatus body. Further, the at least one communication interface may be configured for transmitting the at least one parameter control command to the at least one content capturing device. Further, the at least one content capturing device executes at least one of the plurality of operations with the at least one parameter based on the at least one parameter control command.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating controlling operation of a content capturing device, embodiments of the present disclosure are not limited to use only in this context.

In general, the method disclosed herein may be performed by one or more computing devices. For example, in some embodiments, the method may be performed by a server computer in communication with one or more client devices (user devices) over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a supercomputer, a mainframe computer, mini-computer, microcomputer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the processing device may include a processing unit. Further, the server computer may include a communication device configured for communicating with one or more external devices. Further, the communication device may be a communication interface. Further, the communication device may include a communication unit, a communication connection, etc. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel.

Accordingly, the communication device may be configured for performing one or more of transmitting and receiving of information in electronic form. Further, the server computer may include a storage device configured for performing data storage and/or data retrieval operations. Further, the storage device may be a memory device. Further, the storage device may include a storage unit. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

In a basic configuration, a computing device of the one or more computing devices may include at least one processing unit (processing device) and a system memory (memory device). Depending on the configuration and type of computing device, system memory may comprise, but is not limited to, volatile (e.g. random-access memory (RAM)), non-volatile (e.g. read-only memory (ROM)), flash memory, or any combination. System memory may include operating system, one or more programming modules, and may include a program data. Operating system, for example, may be suitable for controlling computing device operation. Computing device may have additional features or functionality. For example, computing device may also include additional data storage devices (removable and/or non-removable) such as, for example, magnetic disks, optical disks, or tape. Such additional storage is a removable storage and a non-removable storage. Computer storage media may include volatile and non-volatile, removable and non-removable media implemented in any method or technology for storage of information, such as computer-readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device. Any such computer storage media may be part of device. Computing device may also have input device(s) such as a keyboard (HID keyboard device), a mouse, a pen, a sound input device, a touch input device, a location sensor, a camera, a biometric sensor, etc. Output device(s) such as a display, speakers, a printer, etc. may also be included. Computing device may also contain a communication connection that may allow device to communicate with other computing devices, such as over a network in a distributed computing environment, for example, an intranet or the Internet. Communication connection is one example of communication media. By way of example, and not limitation, communication media may include wired media such as a wired network or direct-wired connection, and wireless media such as acoustic, radio frequency (RF), infrared, and other wireless media. As stated above, a number of program modules and data files may be stored in system memory, including operating system. While executing on processing unit, programming modules may perform processes including, for example, one or more stages of methods, algorithms, systems, applications, servers, databases as described above.

Further, the processing device may be the processing unit. Further, the memory device may be the system memory. Further, the communication interface may be the communication connection.

Overview:

The present disclosure describes methods, systems, apparatuses, and devices for facilitating controlling operation of a content capturing device.

Further, the present disclosure describes methods and systems for facilitating controlling camera operations using an ergonomic handle. Further, the disclosed ergonomic handle (or ergonomic handle) may include a camera handle that allows an operator to have fingertip (and thumb) control over programmable/clickable wheels comprised in the handle.

Further, the ergonomic handle may allow changing of parameters of cameras with one click without removing the hand from the handle and without taking eyes off a subject. Further, the disclosed ergonomic handle may modify a professional camera handle to make it compatible with smartphones/tablets. Further, the ergonomic handle may provide ergonomic control of multiple programmable features and dials of a small device like a phone or tablet. Further, the disclosed ergonomic handle may be wired to minimize latency. Further, in an embodiment, the handle may be wireless. Further, the ergonomic handle may include dials that may be rotatable. Further, in an instance, the dials may be associated with multiple possible positions that allow the operator (or a user) to change values rapidly but predictably—as if they were turning a mechanical camera parameter dial without removing the hand from the handle. Further, in an instance, the values may include camera properties such as shutter speed, ISO, aperture, focus, zoom, etc. Further, the dials may be clickable, with the clicks being set to multiple different camera functions. Further, the dials may act as a button to select or navigate menus. Further, the ergonomic handle may include a small thumb joystick. Further, the disclosed ergonomic handle may be associated with an ergonomic package so the operator may hold the ergonomic handle in one hand and thereby support the entire camera or smartphone/tablet. Further, long clicks of the thumbwheels may be set to a different function. Further, the ergonomic handle may include a first thumbwheel positioned so it fits directly under the thumb while not requiring the thumb to rest on the first thumbwheel. Further, the ergonomic handle may include a second thumbwheel positioned so a forefinger of the operator may naturally access the second thumbwheel while not requiring the finger to rest on the second thumbwheel. Further, both of the first thumbwheel and the second thumbwheel may be clicked for additional functionality. Further, the ergonomic handle may include a wired connection to at least one of a smartphone camera, a tablet camera, and a physical camera device. Further, the ergonomic handle may include multi-functional programmable clickable and rotatable dials and buttons. Further, the ergonomic handle may be wirelessly connected to at least one of a smartphone camera, a tablet camera, and a physical camera device. Further, the ergonomic handle may present itself as a Human Interface Device (HID) keyboard device (Bluetooth or USB) to a smartphone, a tablet, or a physical camera device for maximum compatibility.

Further, the present disclosure describes an ergonomic handle for facilitating controlling camera operations using an ergonomic handle attached to at least one device. Further, the ergonomic handle may be operatively coupled with at least one device. Further, the at least one device may include a camera. Further, the ergonomic handle may include a plurality of programmable input devices configured for controlling at least one camera parameter associated with the at least one device. Further, the at least one device may be configured for generating a photographic content, a videographic content, a digital cinematographic content, etc. Further, the photographic content may include a video, an image, an audio-video, etc. Further, the photographic content may be characterized by the at least one camera parameter. Further, the at least one camera parameter may be controlled by at least one user (or an operator) using the ergonomic handle. Further, the plurality of programmable input devices may include a thumb-operated joystick, a clickable thumbwheel, a rotary push button thumbwheel, a thumbwheel, a rotatable dial, a push button switch, a sliding switch, etc. Further, the at least one camera parameter may include a menu navigation, a photography mode navigation, a shutter speed, an ISO, an aperture, an electronic ND, an audio gain (ganged and L/R individual), a White Balance (momentary auto WB also), a focus, a VFR rate control, etc. Further, each of the plurality of programmable input devices may be configured for transitioning between a plurality of input device states. Further, the ergonomic handle may be configured for generating a parameter control command for controlling the at least one camera parameter based on the transitioning of the plurality of programmable input devices between the plurality of input device states. Further, the ergonomic handle may be configured for transmitting the parameter control command to the at least one device. Further, the at least one camera parameter may be programmably associated with the plurality of input device states. Further, in an instance, the plurality of input device states associated with the push button switch may include at least one depressed state and at least one raised state. Further, in an instance, the plurality of input device states associated with the thumb-operated joystick may include a position of the thumb-operated joystick. Further, in an instance, the plurality of input device states associated with the rotatable dial may include a plurality of dial positions. Further, in an instance, the plurality of input device states associated with the clickable thumbwheel may include a short click, a long click, and at least one thumbwheel position. Further, the ergonomic handle may include a plurality of openings for receiving the plurality of programmable input devices. Further, the ergonomic handle may include a handle designed for single-hand usage by an operator. Further, the handle may include a plurality of depressions on an outer surface of the ergonomic handle. Further, each of the plurality of depressions may be designed for ergonomically receiving fingers of the operator. Further, the receiving of the fingers in the plurality of depressions may allow the operator to snugly grip the handle between the fingers and palm by applying a small compressing force on the ergonomic handle. Further, in some embodiments, the handle a plurality of depression inserts disposed in the plurality of depressions. Further, the plurality of depression inserts may be made from a non-slipping material that increases frictional force between the fingers and the ergonomic handle. Further, the increase in frictional force prevents slippage of the ergonomic handle from the fingers. Further, the non-slipping material may include rubber.

Further, the thumbwheel may include a first thumb wheel and a second thumbwheel. Further, the first thumbwheel may be disposed in a first thumbwheel opening positioned directly under a thumb of the operator holding the ergonomic handle. Further, the second thumbwheel may be disposed in a second thumbwheel opening positioned directly under a distal portion of a forefinger of the operator holding the ergonomic handle. Further, the plurality of openings may include the first thumbwheel opening and the second thumbwheel opening.

Further, the ergonomic handle may be detachably attached to the at least one device using a mechanism. Further, the mechanism may be configured for transitioning between a locked state and an unlocked state based on a receiving of a force by the mechanism. Further, the mechanism may be attached to the at least one device in the locked state. Further, the mechanism may be detached from the at least one device in the unlocked state. Further, the ergonomic handle may be an ergonomic camera accessory for smartphone or tablet camera apps.

Further, the ergonomic handle may be communicatively coupled to the at least one device using a LANC (Logic Application Control Bus System or Local Application Control Bus System). Further, the handle may include a LANC cable. Further, a jack of the LANC cable may be coupled to a LANC port comprised in the at least one device.

Further, the handle may be wirelessly communicatively coupled to the at least one device over a communication network, such as, but not limited to, the Internet. Further, the at least one device may include at least one first device. Further, the at least one first device may include a smartphone, a tablet, a laptop, a personal computer, a mobile phone, etc. Further, the at least one first device may include a camera configured for generating the photographic content. Further, in an instance, the at least one first device may be communicatively coupled to the at least one device using the LANC system. Further, in another instance, the at least one first device may be wirelessly communicatively coupled to the ergonomic handle over the communication network, such as, but not limited to, the Internet. Further, the at least one first device may be configured for processing the parameter control command to generate a camera command. Further, the at least one first device may be communicatively coupled with at least one camera. Further, the at least one first device may be configured for transmitting the camera command to the at least one camera. Further, the at least one camera may include an external camera device. Further, the at least one camera may be configured for generating the photographic content. Further, the photographic content may be characterized by the at least one camera parameter. Further, the at least one camera may be configured for adjusting the at least one camera parameter based on receiving the camera command.

Further, the ergonomic handle may include a wired connection to a camera device. Further, the ergonomic handle may be ergonomic in design. Further, the ergonomic handle may include programmable, rotatable and clickable wheels positioned with easy fingertip access. Further, the at least one device may include a smartphone. Further, the ergonomic handle may include a direct wired connection to the smartphone for direct camera app control. Further, the ergonomic handle may include rotatable clickable dials. Further, the ergonomic handle may present itself as a HID keyboard device (USB or Bluetooth) for providing maximum support on mobile devices and for easy implementation for other developers.

Further, the ergonomic handle may be coupled with at least one device. Further, the ergonomic handle may be wirelessly connected to the at least one device. Further, the ergonomic handle is coupled with at least one device which is remotely linked to a different device, in accordance with some embodiments. Accordingly, the at least one device may be controlled using a software platform associated with the disclosed device and the at least one first device. Further, this may be very useful in situations where the camera is not physically within reach to the at least one user (e.g. it is mounted on the outside of a vehicle, or it is too high, too low to reach comfortably). Further, the software platform may act as a controller for the at least one device (such as the camera). Further, the controlling of the at least one device may include controlling camera parameters (such as the at least one camera parameter). Further, there is a connection between the at least one first device (such as the smartphone) and a remote camera (such as the at least one camera). Further, the ergonomic handle controls the remote camera via the smartphone.

Further, the present disclosure describes a system for facilitating controlling camera operations using an ergonomic handle. Further, the system may include a communication device, a processing device, and a storage device. Further, the communication device may be communicatively coupled to the ergonomic handle. Further, the communication device may be configured for receiving a request from at least one user device associated with at least one user (or an operator). Further, the at least one user may include an individual, an institution, and an organization that may want to control camera operations associated with at least one device. Further, the at least one device may include a camera device. Further, the at least one user device may include a smartphone, a tablet, a mobile, a laptop, a personal computer, and so on. Further, the communication device may be configured for transmitting a parameter control data to the at least one user device. Further, the parameter control data may include the at least one camera parameter that the at least one user may want to control. Further, the communication device may be configured for receiving at least one response corresponding to the parameter control data from the at least one user device. Further, the communication device may be configured for transmitting a programmable output to the ergonomic handle. Further, the programmable output may facilitate programming of the plurality of programmable input devices. Further, the processing device may be configured for analyzing the at least one response and the parameter control data for generating the programmable output. Further, the storage device may be configured for retrieving the parameter control data based on the receiving of the request. Further, the storage device may be configured for storing the programmable data and the at least one response.

Further, the communication device may be configured for receiving an output request from the at least one user device. Further, the output request may indicate that the at least one user may want to access a second programmable output associated with at least one second user Further, the output request may include a user identifier associated with an identity of the at least one user. Further, the user identifier may be associated with a first level of photography skill of the at least one user. Further, the user identifier may include a professional photographer, a novice photographer, a freelancer, etc. Further, the at least one second user may include an individual with a second level of photography skill. Further, the communication device may be configured for transmitting the output request to at least one second user device. Further, the communication device may be configured for receiving an approval corresponding to the output request from the at least one second user device. Further, the at least one second user device may include a smartphone, a tablet, a mobile, a laptop, a personal computer, and so on. Further, the communication device may be configured for transmitting the second programmable output to the at least one user device. Further, the storage device may be configured for retrieving the second programmable output based on the receiving of the approval.

Figure 1:
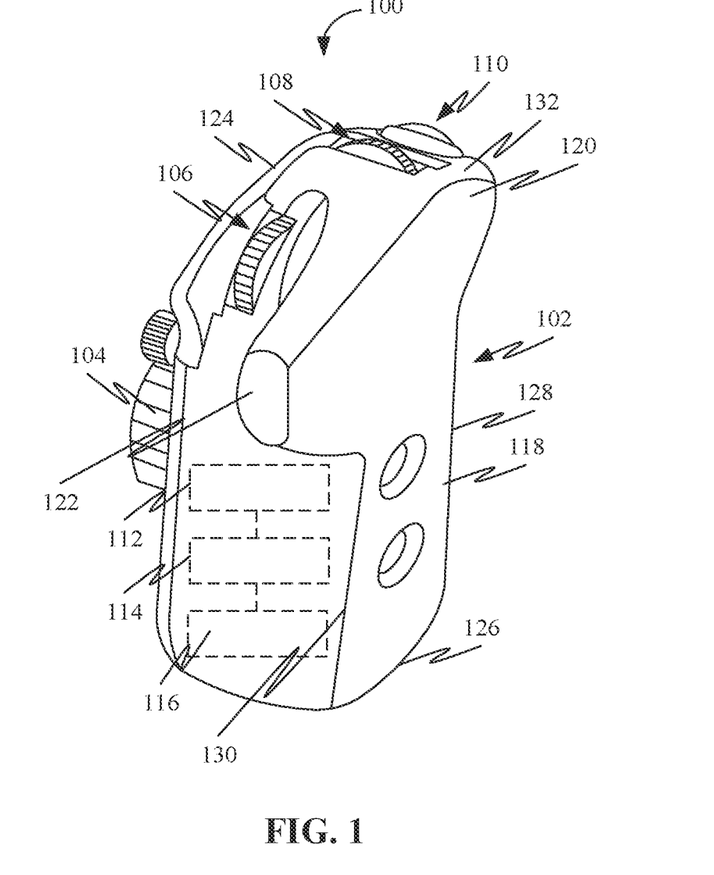
FIG. 1 is a front top perspective view of an apparatus for facilitating controlling operation of a content capturing device, in accordance with some embodiments.

FIG. 1 is a front top perspective view of an apparatus 100 for facilitating controlling operation of a content capturing device, in accordance with some embodiments. Accordingly, the apparatus 100 may include an apparatus body 102, at least one attachment mechanism 104, a plurality of input devices 106-110, a memory device 112, a processing device 114, and at least one communication interface 116. Further, the apparatus 100 may include an ergonomic handle.

Figure 2:
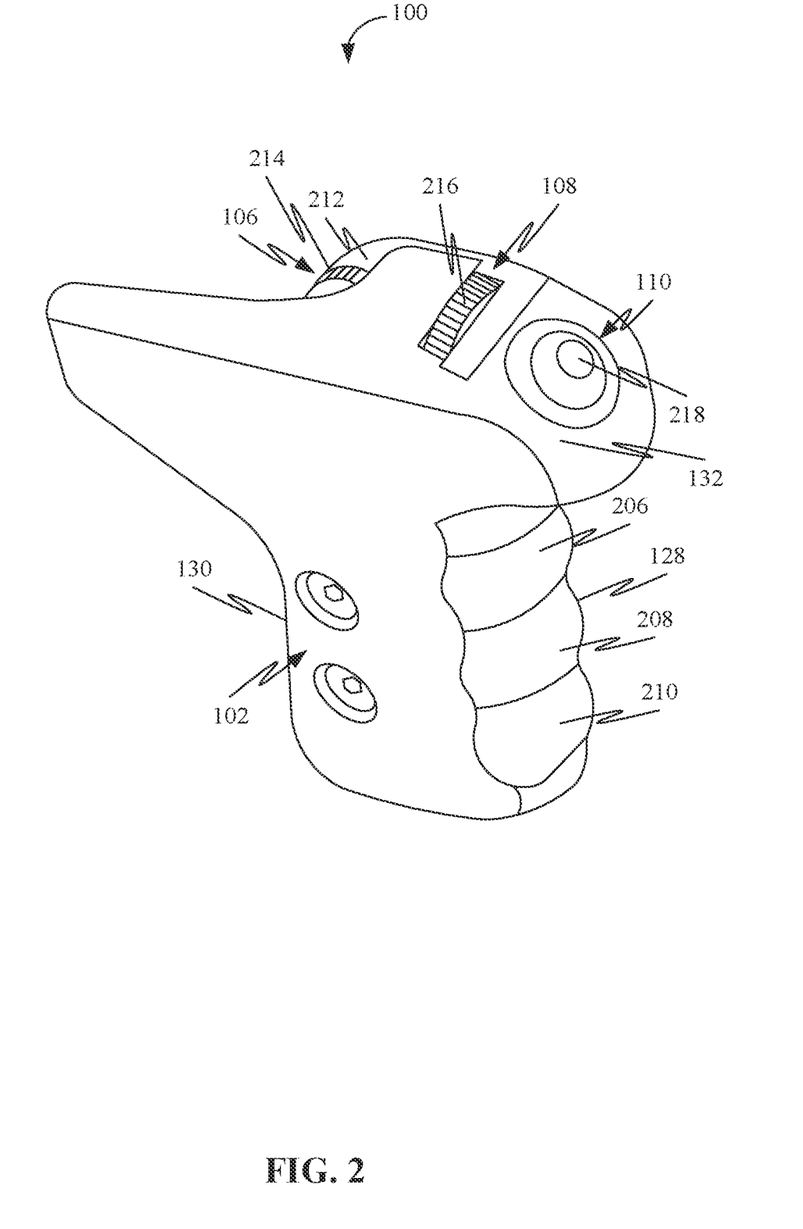
FIG. 2 is a top right side perspective view of the apparatus, in accordance with some embodiments.
Figure 5:
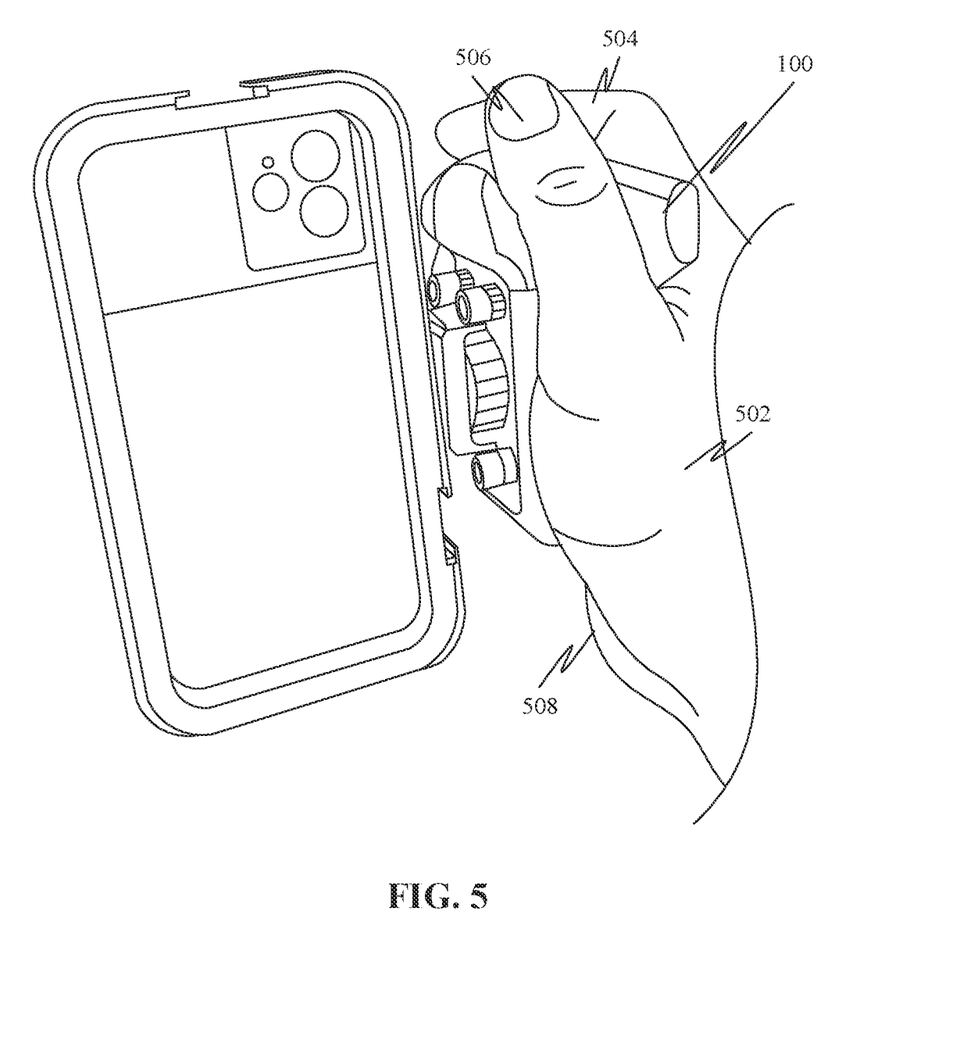
FIG. 5 is a front perspective view of the apparatus held in the human hand with the at least one content capturing device, in accordance with some embodiments.

Further, the apparatus body 102 may include a shaft portion 118, a first shoulder portion 120, and a second shoulder portion 122. Further, the shaft portion 118 may be a handle portion. Further, the shaft portion 118 extends between a first end 124 and a second end 126. Further, the shaft portion 118 may include a first side 128 and a second side 130 opposite to the first side 128. Further, the shaft portion 118 may include at least one first depression 206-210, as shown in FIG. 2, laterally disposed on the first side 128 along a length of the shaft portion 118. Further, the shaft portion 118 may include a second depression 212, as shown in FIG. 2, longitudinally disposed on the second side 130 proximal to the first end. Further, the first shoulder portion 120 extends laterally on the first side 128 in relation to the shaft portion 118 from the first end. Further, the second shoulder portion 122 extends laterally on the second side 130 in relation to the shaft portion 118 from the first end. Further, the at least one first depression 206-210 may be configured for receiving at least one finger (504) of a human hand 502, as shown in FIG. 5. Further, the second depression 212 may be configured for receiving a thumb 506 of the human hand 502, as shown in FIG. 5. Further, the shaft portion 118 may be configured to be grasped by a palm 508, as shown in FIG. 5, of the human hand 502, the at least one finger (504), and the thumb 506 based on the receiving of the at least one finger (504) and the receiving of the thumb 506 for holding the apparatus body 102 by the human hand 502.

Further, the at least one attachment mechanism 104 may be attached to the apparatus body 102. Further, the at least one attachment mechanism 104 may be configured for coupling the apparatus body 102 to at least one content capturing device 402. Further, the coupling may include mechanical coupling of the apparatus body 102 to the at least one content capturing device 402. Further, the at least one content capturing device 402 may include a camera device, a smartphone (iOS, Android, etc.) that includes cameras, a smart device that includes cameras, etc Further, the plurality of input devices 106-110 may include a first input device 106, a second input device 108, and a third input device 110. Further, the plurality of input devices 106-110 may be a plurality of programmable input devices. Further, the first input device 106 may be mounted in the second depression 212, the second input device 108 may be mounted on the first end of the shaft portion 118, and the third input device 110 may be mounted on a top side 132 of the first shoulder portion 120. Further, at least one of the first input device 106, the second input device 108, and the third input device 110 may be reachable for manipulating by at least one of the thumb 506 and the at least one finger (504) while holding the apparatus body 102 based on the mounting of at least one of the first input device 106, the second input device 108, and the third input device 110. Further, the plurality of input devices 106-110 may be programmable for controlling at least one parameter of at least one of a plurality of operations of the at least one content capturing device 402. Further, the plurality of operations may include a changing of at least one camera parameter of the at least one content capturing device 402, a toggling of cameras of the at least one content capturing device 402 for content capturing, a navigating of menus associated with the at least one content capturing device 402, a navigation of content on the at least one content capturing device 402, etc. Further, the at least one parameter may include a value of the at least one camera parameter of the at least one content capturing device 402, an indication of a camera for the toggling of the cameras of the at least one content capturing device 402 for the content capturing, a navigation indication for the navigating of the menus associated with the at least one content capturing device 402, a navigation indication for the navigation of the content on the at least one content capturing device 402, etc. Further, at least one of the plurality of input devices 106-110 may be configured to be transitioned to one of a plurality of input device states for the controlling of the at least one parameter of at least one of the plurality of operations based on the manipulating. Further, at least one of the first input device 106, the second input device 108, and the third input device 110 may include at least one movable element (214, 216, and 218), as shown in FIG. 2, movably mounted on the apparatus body 102. Further, the at least one movable element 214 of the first input device 106 may be configured to be moved between a plurality of positions based on at least one input user action received by the at least one movable element 214 from the thumb 506. Further, the at least one movable element 216 of the second input device 108 may be configured to be moved between the plurality of positions based on the at least one input user action received by the at least one movable element 216 from an index finger 504 of the at least one finger (504). Further, the at least one movable element 218 of the third input device 110 may be configured to be moved between the plurality of positions based on the at least one input user action received by the at least one movable element 218 from the index finger 504. Further, the transitioning of at least one of the plurality of input devices 106-110 to one of the plurality of input device states corresponds to the moving of the at least one movable element (214, 216, and 218) of at least one of the first input device 106, the second input device 108, and the third input device 110 to one of the plurality of positions.

Figure 4:
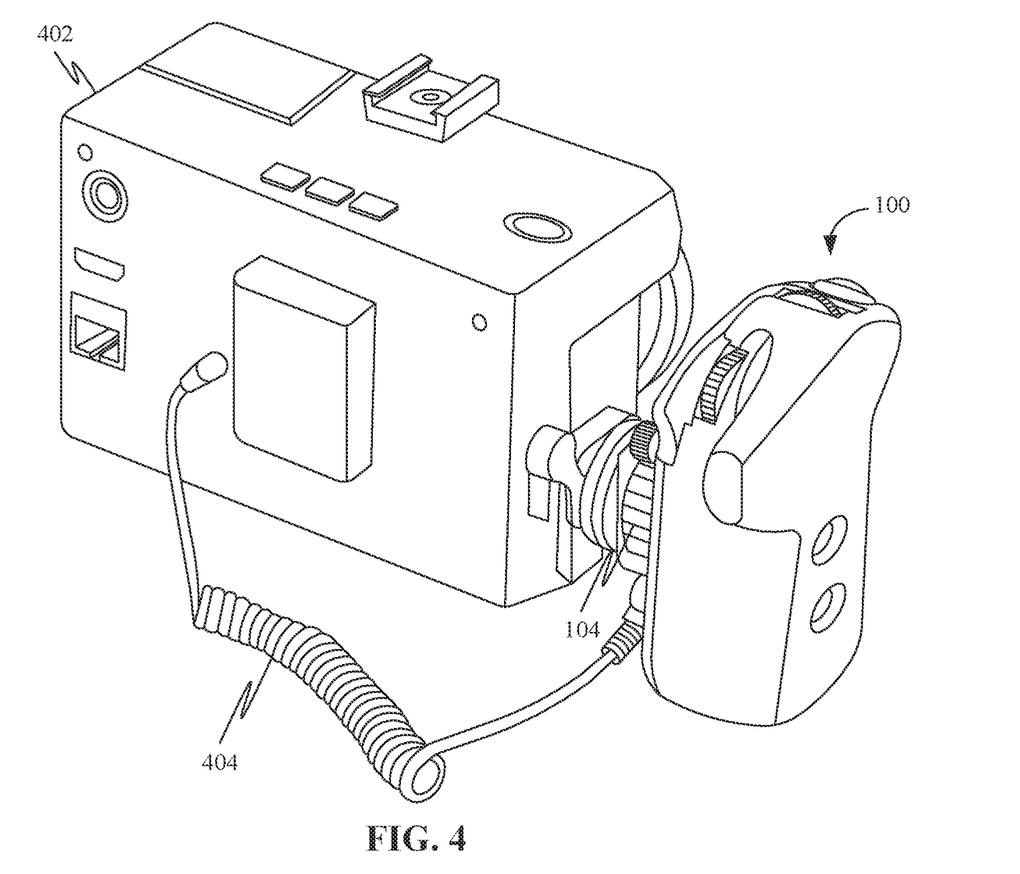
FIG. 4 is a front top perspective view of the apparatus with the at least one content capturing device, in accordance with some embodiments.

Further, the memory device 112 may be disposed on the apparatus body 102. Further, the memory device 112 may be configured for retrieving a map data comprising a mapping between at least one of the plurality of input device states of at least one of the plurality of input devices 106-110 and at least one of a plurality of parameter control commands for the controlling of the at least one parameter of at least one of the plurality of operations of the at least one content capturing device 402, as shown in FIG. 4.

Further, the processing device 114 may be disposed on the apparatus body 102. Further, the processing device 114 may be communicatively coupled with the plurality of input devices 106-110 and the memory device 112. Further, the processing device 114 may be configured for generating at least one parameter control command based on at least one of the plurality of input device states of at least one of the plurality of input devices 106-110 and the map data.

Further, the at least one communication interface 116 may be disposed on the apparatus body 102. Further, the at least one communication interface 116 may be configured for transmitting the at least one parameter control command to the at least one content capturing device 402. Further, the at least one content capturing device 402 executes at least one of the plurality of operations with the at least one parameter based on the at least one parameter control command.

Further, in some embodiments, the at least one movable element (214 and 216) of at least one of the first input device 106 and the second input device 108 may include at least one rotatable dial. Further, at least one rotatable dial may be configured to be rotated to one of a plurality of dial positions. Further, the moving of the at least one movable element (214 and 216) to one of the plurality of positions may include the rotating of the at least one rotatable dial to one of the plurality of dial positions.

Further, in an embodiment, the at least one rotatable dial may be configured to be pressed to one of a plurality of first dial positions. Further, the moving of the at least one movable element to one of the plurality of positions may include the pressing of the at least one rotatable dial to one of the plurality of first dial positions.

Further, in some embodiments, the at least one movable element 218 of the third input device 110 may include at least one button. Further, the at least one button may be configured to be pressed to one of a plurality of button positions. Further, the moving of the at least one movable element 218 to one of the plurality of positions may include the pressing of the at least one button to one of the plurality of button positions.

Further, in some embodiments, the controlling of the at least one parameter may include selecting a value from a plurality of values for the at least one parameter. Further, the selecting of the value from the plurality of values corresponds to the transitioning of at least one of the plurality of input devices 106-110 to one of the plurality of input device states.

Further, in some embodiments, the transmitting of the at least one parameter control command may include transmitting the at least one parameter control command to the at least one content capturing device 402 over a wired communication channel 404, as shown in FIG. 4. Further, the wired communication channel 404 may be a LANC cable, USB-C cable, a lighting cable, etc.

Further, in some embodiments, the transmitting of the at least one parameter control command may include transmitting the at least one parameter control command to the at least one content capturing device 402 over a wireless communication channel. Further, the wireless communication channel may include Bluetooth, Infrared, Near Field Communication (NFC), etc.

Further, in some embodiments, the at least one attachment mechanism 104 may be configured for detachably coupling the apparatus body 102 to the at least one content capturing device 402.

Further, in some embodiments, the at least one communication interface 116 may be further configured for receiving at least one programming data for programming at least one of the plurality of input devices 106-110 from at least one user device. Further, the at least one user device may include a computing device, a client device, etc. Further, the at least one programming data may include a user mapping of at least one of the plurality of input device states of at least one of the plurality of input devices 106-110 to at least one of a plurality of parameter control commands for the controlling of the at least one parameter of at least one of the plurality of operations of the at least one content capturing device 402. Further, the processing device 114 may be configured for analyzing the at least one programming data. Further, the processing device 114 may be configured for generating the map data based on the analyzing. Further, the memory device 112 may be configured for storing the map data. Further, the retrieving of the map data may be based on the storing.

Figure 6:
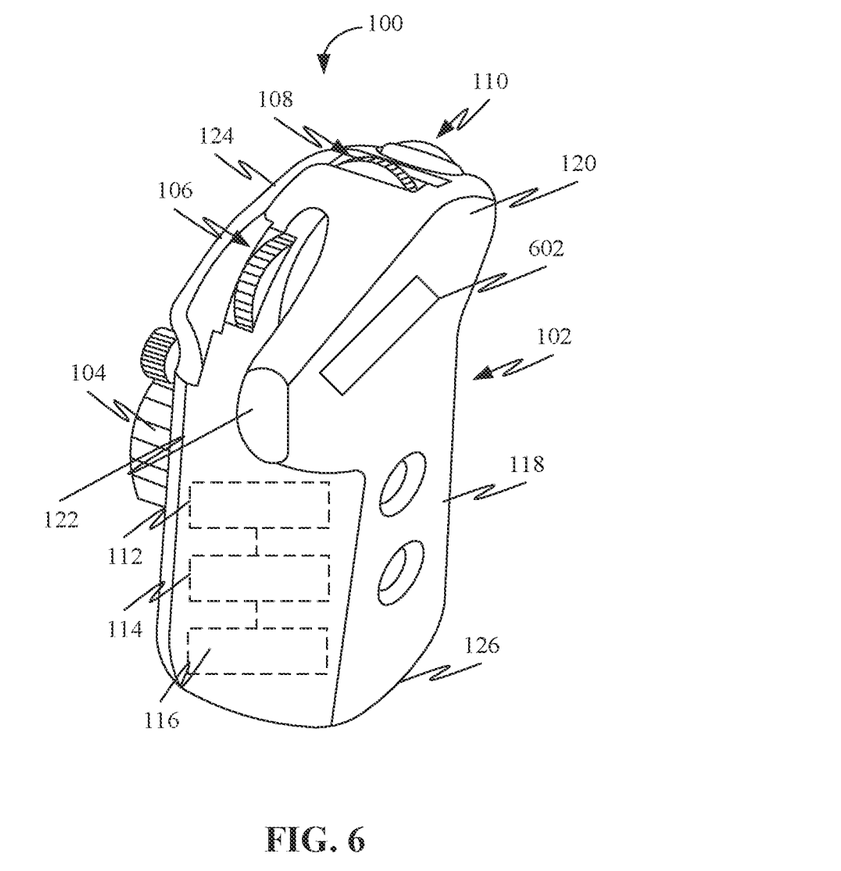
FIG. 6 is a front top perspective view of the apparatus, in accordance with some embodiments.

Further, in some embodiments, the processing device 114 may be configured for generating at least one indication of at least one of the plurality of operations for at least one of the plurality of input devices 106-110 based on the map data. Further, the apparatus 100 may include at least one output device 602, as shown in FIG. 6, mounted on the apparatus body 102. Further, the at least one output device 602 may be communicatively coupled with the processing device 114. Further, the at least one output device 602 may be configured for presenting the at least one indication. Further, the at least one output device 602 may include a display device, a speaker, etc.

Further, in some embodiments, the at least one communication interface 116 may be configured for receiving at least one operation data associated with at least one of the plurality of operations from the at least one content capturing device 402. Further, the at least one operation data may include at least one characteristic of at least one of the plurality of operations. Further, the at least one characteristic of at least one of the plurality of operations may include a type of operation, a variable of operation, etc. Further, the processing device 114 may be configured for analyzing the at least one operation data based on at least one input device data associated with at least one of the plurality of input device data. Further, at least one input device data may include a type of the plurality of input device states of at least one of the plurality of input devices. Further, the processing device 114 may be configured for mapping at least one of the plurality of input device states of at least one of the plurality of input devices 106-110 to at least one of a plurality of parameter control commands for the controlling of the at least one parameter of at least one of the plurality of operations of the at least one content capturing device 402 based on the analyzing. Further, the processing device 114 may be configured for generating the map data based on the mapping. Further, the memory device 112 may be configured for storing the map data. Further, the retrieving of the map data may be based on the storing.

Further, in some embodiments, the processing device 114 may be configured for generating at least one indication of at least one of the plurality of operations for at least one of the plurality of input devices 106-110 based on the map data. Further, the apparatus 100 may include at least one output device 602, as shown in FIG. 6, mounted on the apparatus body 102. Further, the at least one output device 602 may be communicatively coupled with the processing device 114. Further, the at least one output device 602 may be configured for presenting the at least one indication.

Further, in some embodiments, the second shoulder portion 122 rests on a portion of the human hand 502 between the thumb 506 and the index finger 504 for supporting the apparatus body 102 on the human hand 502 and the first shoulder portion 120 rests on a middle finger of the at least one finger (504) for the supporting of the apparatus body 102 while holding the apparatus body 102.

Further, in some embodiments, the generating of the at least one parameter control command based on at least one of the plurality of input device states of at least one of the plurality of input devices 106-110 and the map data comprising generating the at least one parameter control command using at least one communication protocol associated with the at least one content capturing device 402 based on at least one of the plurality of input device states of at least one of the plurality of input devices 106-110 and the map data. Further, the at least one communication protocol may be compatible with the at least one content capturing device 402. Further, the at least one parameter control command generated using at least one communication protocol may be acceptable by the at least one content capturing device 402. Further, the at least one communication protocol may include a Logic Application Control Bus System or Local Application Control Bus System (LANC) communication protocol, a Bluetooth protocol for a HID keyboard device, etc. Further, in an instance, the at least one communication protocol allows at least one of the plurality of input devices 106-110 to mimic the HID keyboard device associated with the at least one content capturing device 402.

Further, in some embodiments, the at least one attachment mechanism 104 may be configured for rotatably coupling the apparatus body 102 to at least one content capturing device 402. Further, the at least one attachment mechanism 104 may be configured for orienting the at least one content capturing device 402 in at least one orientation in relation to the apparatus body 102 based on the rotatably coupling.

FIG. 2 is a top right side perspective view of the apparatus 100, in accordance with some embodiments.

Figure 3:
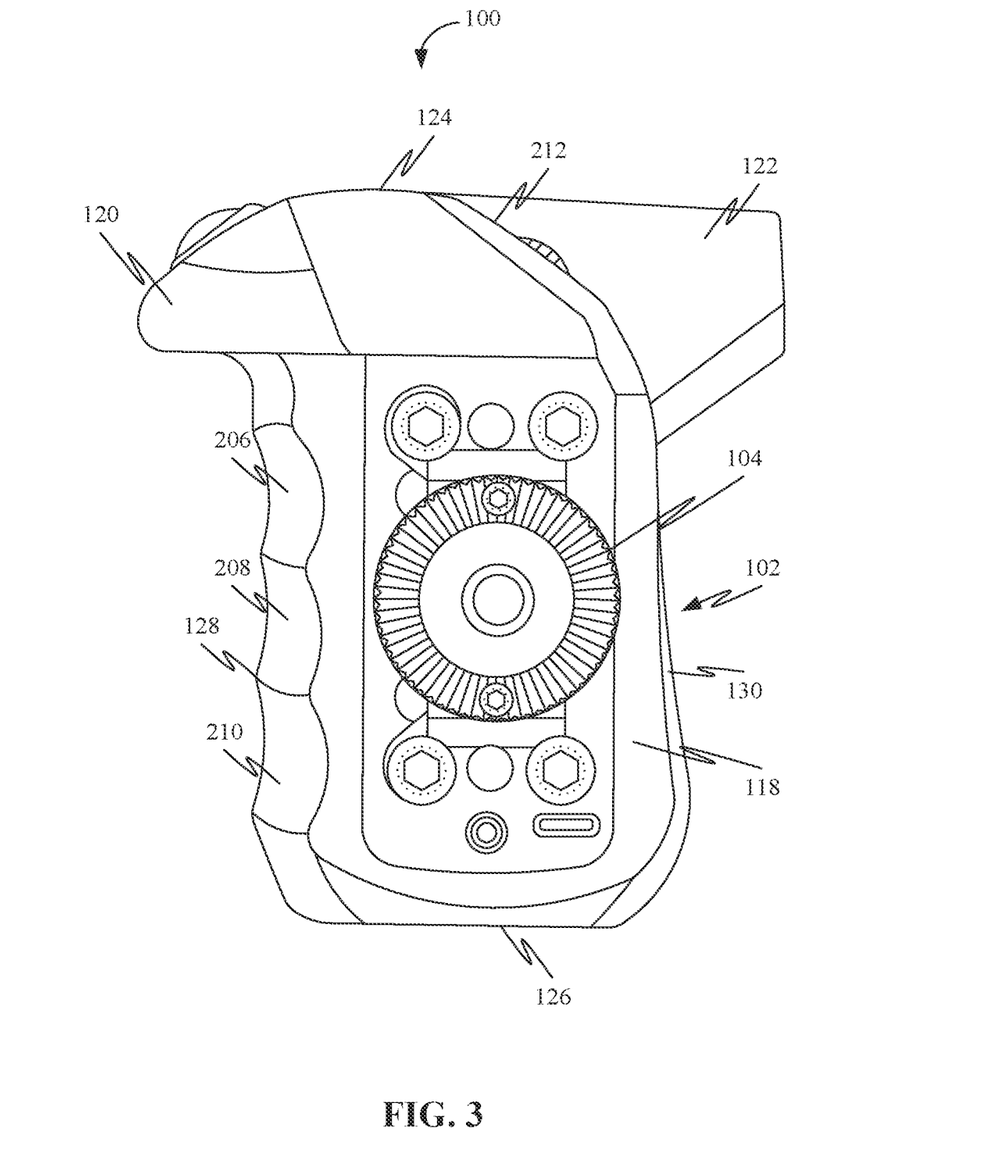
FIG. 3 is a left side view of the apparatus, in accordance with some embodiments.

FIG. 3 is a left side view of the apparatus 100, in accordance with some embodiments.

FIG. 4 is a front top perspective view of the apparatus 100 with the at least one content capturing device 402, in accordance with some embodiments.

FIG. 5 is a front perspective view of the apparatus 100 held in the human hand 502, in accordance with some embodiments.

FIG. 6 is a front top perspective view of the apparatus 100, in accordance with some embodiments.

Although the present disclosure has been explained in relation to its preferred embodiment, it is to be understood that many other possible modifications and variations can be made without departing from the spirit and scope of the disclosure.

What is claimed is:

1. An apparatus for facilitating controlling operation of a content capturing device, the apparatus comprising:
- an apparatus body comprising a shaft portion, a first shoulder portion, and a second shoulder portion, wherein the shaft portion extends between a first end and a second end, wherein the shaft portion comprises a first side and a second side opposite to the first side, wherein the shaft portion comprises at least one first depression laterally disposed on the first side along a length of the shaft portion, wherein the shaft portion comprises a second depression longitudinally disposed on the second side proximal to the first end, wherein the first shoulder portion extends laterally on the first side in relation to the shaft portion from the first end, wherein the second shoulder portion extends laterally on the second side in relation to the shaft portion from the first end, wherein the at least one first depression is configured for receiving at least one finger of a human hand, wherein the second depression is configured for receiving a thumb of the human hand, wherein the shaft portion is configured to be grasped by a palm of the human hand, the at least one finger, and the thumb based on the receiving of the at least one finger and the receiving of the thumb for holding the apparatus body by the human hand;
- at least one attachment mechanism attached to the apparatus body, wherein the at least one attachment mechanism is configured for coupling the apparatus body to at least one content capturing device;
- a plurality of input devices comprising a first input device, a second input device, and a third input device, wherein the first input device is mounted in the second depression, the second input device is mounted on the first end of the shaft portion, and the third input device is mounted on a top side of the first shoulder portion, wherein at least one of the first input device, the second input device, and the third input device is reachable for manipulating by at least one of the thumb and the at least one finger while holding the apparatus body based on the mounting of at least one of the first input device, the second input device, and the third input device, wherein the plurality of input devices is programmable for controlling at least one parameter of at least one of a plurality of operations of the at least one content capturing device, wherein at least one of the plurality of input devices is configured to be transitioned to one of a plurality of input device states for the controlling of the at least one parameter of at least one of the plurality of operations based on the manipulating, wherein at least one of the first input device, the second input device, and the third input device comprises at least one movable element movably mounted on the apparatus body, wherein the at least one movable element of the first input device is configured to be moved between a plurality of positions based on at least one input user action received by the at least one movable element from the thumb, wherein the at least one movable element of the second input device is configured to be moved between the plurality of positions based on the at least one input user action received by the at least one movable element from an index finger of the at least one finger, wherein the at least one movable element of the third input device is configured to be moved between the plurality of positions based on the at least one input user action received by the at least one movable element from the index finger, wherein the transitioning of at least one of the plurality of input devices to one of the plurality of input device states corresponds to the moving of the at least one movable element of at least one of the first input device, the second input device, and the third input device to one of the plurality of positions;
- a memory device disposed on the apparatus body, wherein the memory device is configured for retrieving a map data comprising a mapping between at least one of the plurality of input device states of at least one of the plurality of input devices and at least one of a plurality of parameter control commands for the controlling of the at least one parameter of at least one of the plurality of operations of the at least one content capturing device;
- a processing device disposed on the apparatus body, wherein the processing device is communicatively coupled with the plurality of input devices and the memory device, wherein the processing device is configured for generating at least one parameter control command based on at least one of the plurality of input device states of at least one of the plurality of input devices and the map data; and
- at least one communication interface disposed on the apparatus body, wherein the at least one communication interface is configured for transmitting the at least one parameter control command to the at least one content capturing device, wherein the at least one content capturing device executes at least one of the plurality of operations with the at least one parameter based on the at least one parameter control command.

2. The apparatus of claim 1, wherein the at least one movable element of at least one of the first input device and the second input device comprises at least one rotatable dial, wherein at least one rotatable dial is configured to be rotated to one of a plurality of dial positions, wherein the moving of the at least one movable element to one of the plurality of positions comprises the rotating of the at least one rotatable dial to one of the plurality of dial positions.

3. The apparatus of claim 2, wherein the at least one rotatable dial is configured to be pressed to one of a plurality of first dial positions, wherein the moving of the at least one movable element to one of the plurality of positions further comprises the pressing of the at least one rotatable dial to one of the plurality of first dial positions.

4. The apparatus of claim 1, wherein the at least one movable element of the third input device comprises at least one button, wherein the at least one button is configured to be pressed to one of a plurality of button positions, wherein the moving of the at least one movable element to one of the plurality of positions comprises the pressing of the at least one button to one of the plurality of button positions.

5. The apparatus of claim 1, wherein the controlling of the at least one parameter comprises selecting a value from a plurality of values for the at least one parameter, wherein the selecting of the value from the plurality of values corresponds to the transitioning of at least one of the plurality of input devices to one of the plurality of input device states.

6. The apparatus of claim 1, wherein the transmitting of the at least one parameter control command comprises transmitting the at least one parameter control command to the at least one content capturing device over a wired communication channel.

7. The apparatus of claim 1, wherein the transmitting of the at least one parameter control command comprises transmitting the at least one parameter control command to the at least one content capturing device over a wireless communication channel.

8. The apparatus of claim 1, wherein the at least one attachment mechanism is configured for detachably coupling the apparatus body to the at least one content capturing device.

9. The apparatus of claim 1, wherein the at least one communication interface is further configured for receiving at least one programming data for programming at least one of the plurality of input devices from at least one user device, wherein the processing device is further configured for:
    analyzing the at least one programming data; and
    generating the map data based on the analyzing, wherein the memory device is further configured for storing the map data, wherein the retrieving of the map data is further based on the storing.

10. The apparatus of claim 9, wherein the processing device is further configured for generating at least one indication of at least one of the plurality of operations for at least one of the plurality of input devices based on the map data, wherein the apparatus further comprises at least one output device mounted on the apparatus body, wherein the at least one output device is communicatively coupled with the processing device, wherein the at least one output device is configured for presenting the at least one indication.

11. The apparatus of claim 1, wherein the at least one communication interface is further configured for receiving at least one operation data associated with at least one of the plurality of operations from the at least one content capturing device, wherein the processing device is further configured for:
    analyzing the at least one operation data based on at least one input device data associated with at least one of the plurality of input device data;
    mapping at least one of the plurality of input device states of at least one of the plurality of input devices to at least one of a plurality of parameter control commands for the controlling of the at least one parameter of at least one of the plurality of operations of the at least one content capturing device based on the analyzing; and
    generating the map data based on the mapping, wherein the memory device is further configured for storing the map data, wherein the retrieving of the map data is further based on the storing.

12. The apparatus of claim 11, wherein the processing device is further configured for generating at least one indication of at least one of the plurality of operations for at least one of the plurality of input devices based on the map data, wherein the apparatus further comprises at least one output device mounted on the apparatus body, wherein the at least one output device is communicatively coupled with the processing device, wherein the at least one output device is configured for presenting the at least one indication.

13. The apparatus of claim 1, wherein the second shoulder portion rests on a portion of the human hand between the thumb and the index finger for supporting the apparatus body on the human hand and the first shoulder portion rests on a middle finger of the at least one finger for the supporting of the apparatus body while holding the apparatus body.

14. The apparatus of claim 1, wherein the generating of the at least one parameter control command based on at least one of the plurality of input device states of at least one of the plurality of input devices and the map data comprises generating the at least one parameter control command using at least one communication protocol associated with the at least one content capturing device based on at least one of the plurality of input device states of at least one of the plurality of input devices and the map data.

15. The apparatus of claim 1, wherein the at least one attachment mechanism is configured for rotatably coupling the apparatus body to at least one content capturing device, wherein the at least one attachment mechanism is configured for orienting the at least one content capturing device in at least one orientation in relation to the apparatus body based on the rotatably coupling.

* * * * *